Jan. 24, 1956     W. D. BUCKINGHAM     2,732,458
POLAR RELAY
Filed Aug. 27, 1952     4 Sheets-Sheet 1
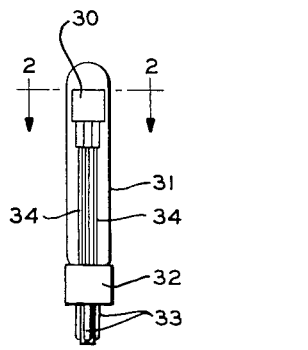
FIG. 1
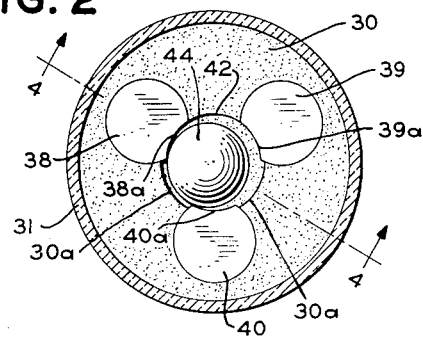
FIG. 2
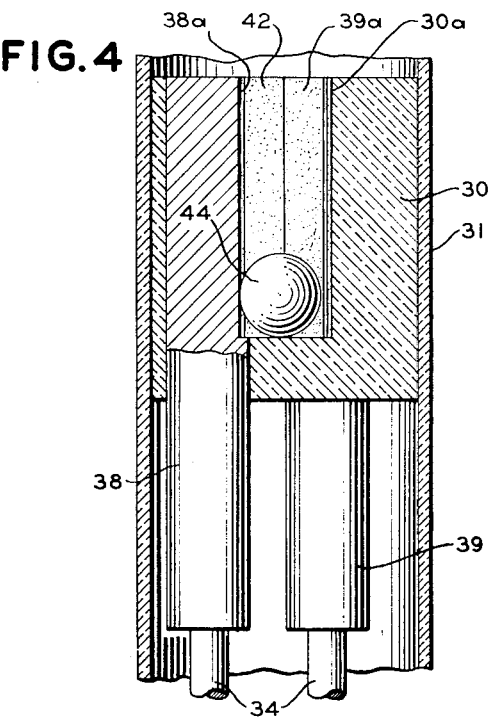
FIG. 4    FIG. 3
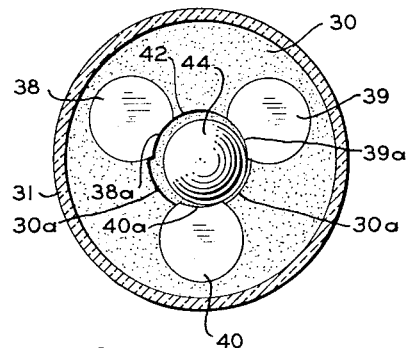
FIG. 6
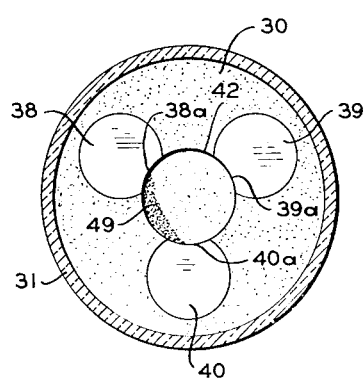
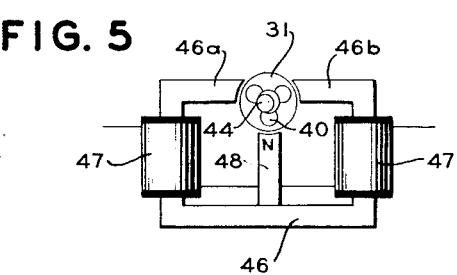
FIG. 5
INVENTOR.
W. D. BUCKINGHAM
BY
*J. F. Presson*
ATTORNEY Jan. 24, 1956  W. D. BUCKINGHAM  2,732,458
POLAR RELAY
Filed Aug. 27, 1952  4 Sheets-Sheet 2
FIG. 7
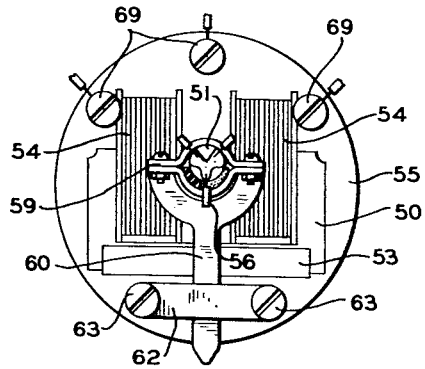
FIG. 8
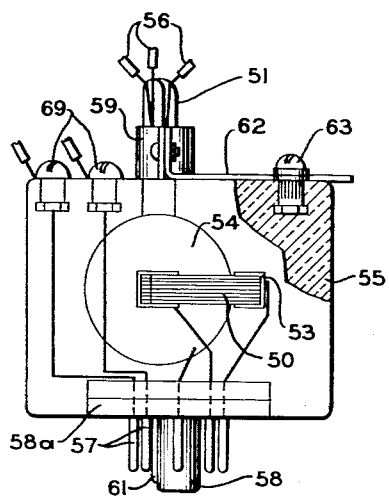
FIG. 9
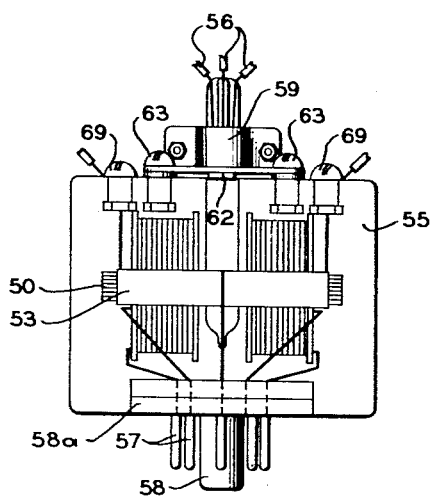
FIG. 11  FIG. 10  FIG. 12
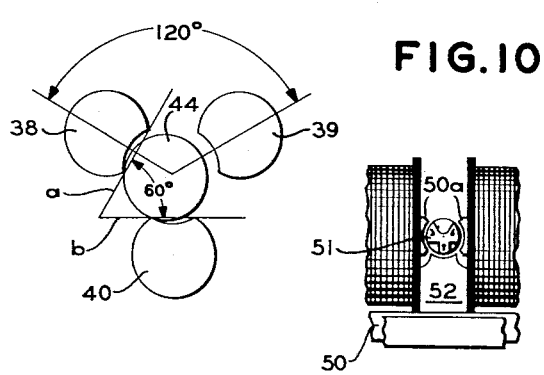 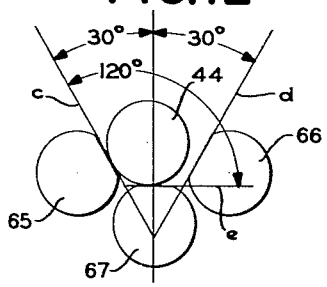
*INVENTOR.*
W. D. BUCKINGHAM
BY  J. F. Presson
ATTORNEY Jan. 24, 1956 W. D. BUCKINGHAM 2,732,458
POLAR RELAY Filed Aug. 27, 1952 4 Sheets-Sheet 3

*INVENTOR.*
W. D. BUCKINGHAM

BY

*ATTORNEY*

Jan. 24, 1956 W. D. BUCKINGHAM 2,732,458
POLAR RELAY
Filed Aug. 27, 1952 4 Sheets-Sheet 4

INVENTOR.
W. D. BUCKINGHAM
BY
ATTORNEY

United States Patent Office
2,732,458
Patented Jan. 24, 1956

2,732,458

POLAR RELAY

William D. Buckingham, Southampton, N. Y., assignor to The Western Union Telegraph Company, New York, N. Y., a corporation of New York Application August 27, 1952, Serial No. 306,690

16 Claims. (Cl. 200—93)

This invention relates to an electromagnetic relay having a contact element composed of magnetizable material disposed in an electromagnetic field and movable by the magnetomotive force of the field to open and close the circuits controlled by the relay, and more particularly to a relay of this character which is suitable for generating or repeating telegraph signals of the polar type.

Various relays have heretofore been devised in which spherical balls or particles of iron and other magnetizable metals or alloys under the influence of an electromagnetic field, are caused either to bridge terminal contact elements to close an external circuit controlled by the relay or to cause the contact elements to open the external circuit, as may be desired. Such relays, however, have been subject to the introduction of mechanical and electrical bias in the relayed signals, and have been difficult to adjust or compensate for bias present in telegraph signals received by the relay or introduced in the signals transmitted by the relay, and furthermore have not been suitable for relaying polar signals.

Among the objects of the instant invention are to overcome the foregoing disadvantages and to provide a more efficient relay of the character described which will operate reliably at high signaling speeds; which has a contact assembly that is self-contained and readily insertable in or removable from the controlling electromagnetic field structure of the relay; and which is especially suitable for relaying polar signals.

These and other objects and advantages of the invention will be apparent from the following detailed description of several illustrative embodiments thereof, taken in connection with the accompanying drawings, in which:

Fig. 1 is a view of one embodiment of the removable contact assembly of the relay, enclosed within an evacuated glass envelope, end removed from its actuating electromagnetic structure;

Fig. 2 is a greatly enlarged cross-sectional view of the contact assembly, taken along the line 2—2 of Fig. 1;

Fig. 3 is similar to Fig. 2, but with the movable contact element of the assembly in a different circuit-controlling position;

Fig. 4 is a longitudinal section of the contact assembly, taken alone the line 4—4 of Fig. 2;

Fig. 5 shows the contact assembly inserted in operative position in its actuating magnetic structure;

Fig. 6 is a view similar to Fig. 2, showing a modified form of the contact assembly in which the comminuted magnetic material comprises the movable contact element of the assembly;

Fig. 7 is a top plan view of a relay unit with the electromagnetic structure sealed in a cylindrical body of a transparent polymerizing resin, the body having a central aperture in which the evacuated envelope containing the relay contact assembly may readily be inserted or removed;

Fig. 8 is a view, in elevation, of the left-hand side of the unit of Fig. 7;

Fig. 9 is a front view, in elevation, of the unit of Fig. 7;

Fig. 10 is a fragmentary view showing certain details of the pole pieces of the magnetic structure of Figs. 7 to 9;

Fig. 11 shows the contours of one form of contact surfaces which may be employed in the relay contact assembly;

Fig. 12 shows the contours of another form of contact surfaces which may be used;

Figure 13:
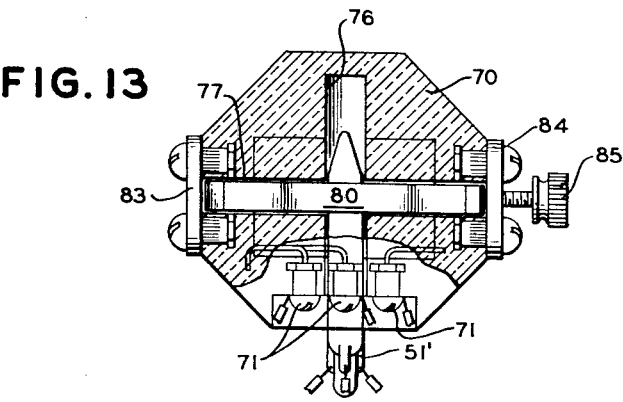
Fig. 13 is a top plan view of a modified form of the relay unit.
Figure 14:
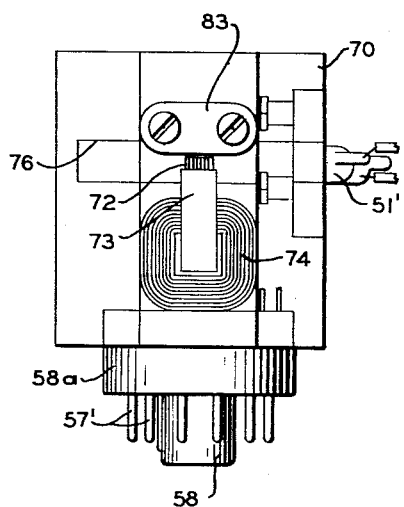
Fig. 14 is a left-hand side view, in elevation, of the unit of Fig. 13.
Figure 15:
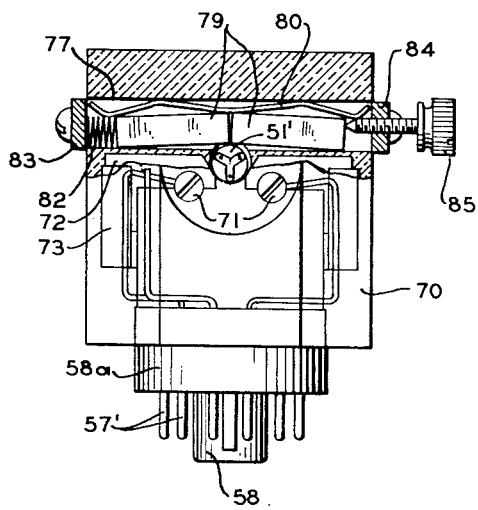
Fig. 15 is a front view, in elevation, of the unit of Fig. 13.

Fig. 1 shows the relay contact assembly, generally indicated at 30, positioned within the glass tube 31, the press of the tube being sealed in an insulating base 32. The base 32 carries eelctrical contact prongs 33 which may be inserted in a socket to connect the assembly to an external circuit, generally in the manner of a radio or television tube. The inner ends of the contact prongs are connected to and support three rigid wires 34 which in turn support the contact assembly within the tube 31 and also electrically connect the contact elements of the assembly with the prongs 33. After the contact assembly and its supporting wires are inserted within the tube the latter is exhausted to a high degree of vacuum, less than 1 micron of mercury pressure, and a getter pill within the tube is fired to give a higher degree of vacuum and to act as a clean-up agent. The tube is then sealed off in known manner, thereby to insure that no arcing will occur between the contact elements within the tube, after which the press of the tube is cemented or otherwise mounted within the base 32. The degree of vacuum should, of course, be sufficiently high to insure that no arcing will occur at the potential of the current controlled by the contact assembly; potentials in excess of 1000 volts may be used with the contact assembly when the tube is exhausted to the degree above mentioned.

The elements of the contact assembly are shown greatly enlarged in Figs. 2, 3 and 4. The member 30 comprises a cylindrical body of a suitable insulating material. For example, and by way of illustration only, glass, ceramics or a material composed of glass and powdered mica designated in the trade as "Mycalex," is molded around three round rods 38, 39 and 40.

An axial hole is drilled or otherwise formed in the upper end of the molded body to form a bore 42 for receiving a ball contact member 44, as shown in Fig. 4. As seen in Figs. 2 and 3, the axial bore 42 results in the formation of arcuate concave contact faces 38a, 39a and 40a in the sides of the rods 38, 39 and 40, respectively. The insulating material is undercut slightly at 30a in order not to interfere with the ball 44 in either of its operating positions. The diameter of the bore 42 is but slightly greater than the diameter of the ball member so that the ball 44, which operates as an armature, need roll only a minute distance, such as a few ten-thousands of an inch, in order to reach either of its two operating positions respectively shown in Figs. 2 and 3. For the sake of clarity, the diameter of the bore 42 relative to the diameter of the ball 44 is exaggerated in the figures, and the various elements of the assembly are shown greatly enlarged. Two or more balls which act in unison may be used in order to provide multiple armature contacts, although in practice it has been found that only one ball is required for polar relays employed in telegraph and other communication circuits, and the following description will in general refer to a single ball. It will be seen that the ball can touch only two contact surfaces 40a and 38a, or 40a and 39a, at any one time. The contact assembly can be quite small in size; for communication circuits the glass tube or envelope 31 may be as small as ¼ inch in diameter and 2 inches long, and the ball 44 may be from 1/16 inch to 1/8 inch in diameter. A ball 1/16 inch in diameter has been found to be entirely satisfactory.

The ball and the rod 40 are made of magnetic material, and preferably the rods 38 and 39 are also made of magnetic material. Powdered metallurgy techniques may be employed to produce both the ball and the rods; a suitable mixture is tungsten carbide, iron powder and fine copper particles. The tungsten carbide and iron preferably are used in equal proportions, for example, 40% of each by weight, and 20% of copper, which mixture is compacted into rods in a press under pressure and then is sintered in a furnace. This produces a magnetic material having a high degree of hardness and possessing good electrical conductivity. In order to reduce porosity a thin wrapping or a wire of copper, silver, rhodium, chromium or other good contact material is wound around the rod which is then put back in the furnace and heated to a temperature below that of the sintering temperature, but above that of the melting point of the metal comprising the contact material, and this melts and flows into any interstices and further increases the conductivity of the mixture. To make a ball, a rod treated as above may be cut to form a small cylinder which is then ground round between two rotating grinding surfaces of, if desired, the mixture may be molded into ball form and then sintered. Chromium, tungsten or other similar hard material may be used in place of, or in addition to, the tungsten carbide, and similarly the tungsten carbide, chromium or tungsten may have cobalt or nickel, instead of iron, admixed therewith to make it magnetic. A ball of steel or other magnetic material may also be used in place of one composed of the above mixtures, which ball preferably is plated with a thin coating of copper, silver, rhodium, chromium or other contact material, for example, with a 0.0002 inch coating; the coating is desirable but not essential since no arcing occurs between the contact surfaces. In the form shown in Figs. 2 to 4, it is preferable that all of the rods be composed of a magnetic material, such as a material described above, but it is not essential that the rods 38 and 39 comprise magnetic material; these may be composed of a non-magnetic conducting material, for example, copper.

Referring to Fig. 5, a laminated magnetic pole 46 has relay windings 47 mounted on legs of the core, and extending upwardly is a permanent bar magnet 48 having the lower end thereof welded or otherwise secured to the laminated core. The tube 31 which contains the relay contact assembly is mounted in the external flux field in the space between the upper end of the permanent magnet 48 and the opposed poles or pole pieces 46a and 46b of the core structure. The field of the permanent magnet causes the ball 44 to remain in contact with the surface 40a of the rod 40 in any operating position of the relay. The upper end or pole of the permanent magnet 48 may be either of north or south polarity, and when polar signals are applied to the windings 47, each of the poles or pole pieces 46a and 46b alternately becomes a north pole and a south pole. Assuming the upper end of magnet 48 to be a north magnetic pole, when the pole 46a is magnetized to south polarity and pole 46b to north polarity by the current flow in windings 47, the ball will contact the surfaces 38a and 40a of the rods and close a circuit through these elements, as seen in Fig. 2, and when the direction of the energizing current is reversed the ball rolls and opens the circuit formerly made and contacts the surfaces 39a and 40a of the rods to close a circuit through the latter contact elements, as seen in Fig. 3. Since the ball need move only a few ten-thousandths of an inch in traveling from one operative position to the other, the travel time may be as short as a few tenths of a millisecond, and the relay will work satisfactorily at frequencies up to 2,000 cycles and higher. With elements having the dimensions set forth hereinbefore, the relay will operate on power as low as 2 milliwatts through the windings 47, and the contact members will carry current of 300 milliamperes and higher.

The ball 44 always tends to contact the highest points on the contact surfaces of the rods to utilize the shortest distance between them and provide a path of lowest magnetic reluctance, and this causes the contact surfaces to wear evenly in any direction, although life tests have proved that the wear is very slight even after the relay has been operated many millions of times. Due to the permanent magnet 48 and the fact that the ball assumes the path of lowest magnetic reluctance, the ball will remain in either of its last operated positions after the energizing signal has ceased. The relay may be used with the tube 31 upright as seen in Fig. 1 or in a horizontal position as seen in Fig. 5 or in any intermediate position, and it also will work with the tube inverted from the position shown in Fig. 1.

In Fig. 6 is shown a form of the relay in which a stream 49 of magnetizable dust particles is employed in lieu of the magnetizable ball. These particles of powdered nickel, iron or cobalt are very small, microns in size if desired; they will operate at very high speeds, for example, over the entire audio range, and will carry currents up to 20 milliamperes and higher.

For simplicity, each of the electromagnets 47 of Fig. 5 is shown as having but one winding, but the relay is adapted for use with an electromagnet having a plurality of different windings as commmonly employed in telegraph relays. In these relays, for example, one winding may be a locking winding, another a biasing winding, and two operate windings may be provided to give greater flexibility in regard to the voltage and current values and circuit connections desired.

Fig. 11 depicts the relative angular relations of the contact surfaces of the ball and rods shown in Figs. 2 to 5. In this embodiment, imaginary lines a and b drawn across the perimeters of the concave portions of any two rods 38 to 40 define an angle of approximately 60°, and imaginary lines respectively drawn through the centers of the rods 38 and 40 and the center of the ball 44 form an angle approximately 120°. This was thought to represent the optimum arrangement from the standpoint of contact efficiency, wear, and speed of operation. Further experimentation disclosed, however, that flat contact faces on the rods provided sufficiently low contact resistance, and resulted in automatic wear compensation in regard to the surface of the rolling ball and the flat contact faces, and there was no possibility of any wedging or shorting action between the contact members. Fig. 12 shows flat contact faces, having a circular periphery, on the rods 65 to 67; the angles between the faces, which are indicated on the figure, are those found to be especially suitable with the structure shown.

Figs. 7 to 10 illustrate another embodiment of the relay structure; Fig. 7 is a top plan view of the unit; Figs. 8 and 9 respectively are side and front views, in elevation, of the unit of Fig. 7; and Fig. 10 is a detail showing the contours of the pole pieces of the magnetic core structure. In this embodiment the electromagnetic structure is embedded in a molded cylindrical body 55 of a suitable insulating material which has high dielectric strength, low power factor, high heat resistance and high arc resistance, such as a polymerizing resin, and which may be poured as a liquid (preferably heated) in a mold disposed around the assembled electromagnetic structure and which thereafter hardens. A styrene plastic such as "Melpak IV" or an ethoxyline resin such as "Araldite E-110" has been found especially suitable.

The laminated core 50, permanent magnet 52 and relay coils 54 on the legs of the core, together with a conventional tube base 58 and the interconnecting wires, are placed within a cup-shaped mold (not shown). A flanged portion 58a of the base 58 is inserted through a circular opening in the bottom of the mold whereby this portion of the base will be imbedded in the molded body 55 in the manner seen in Figs. 8 and 9. The laminations of the magnet core are clamped together by a metal strip 53. Three inserts which receive electrical screw-threaded posts 69, and two inserts which receive screws 63, are positioned at the top of the mold thereby to be imbedded in the molded body. A cylindrical rod is positioned vertically in the mold to produce in the molded body a central aperture of a depth and diameter sufficient ot receive a glass tube 51 which contains the contact assembly; after the insulating material has been poured into the mold and has hardened somewhat, the rod is withdrawn, leaving an aperture in the body 55 slightly larger in diameter than the outer diameter of the glass tube. Stearic acid, glyceryl stearate or the like, silicone greases or other known mold-release agents may be applied to the rod to minimize sticking, or a rod composed of a material which requires no mold-release agent, such as fluoroethylene or "Teflon," may be used.

The base 58 carries a number of electrical contact prongs 57 which may be plugged into a conventional socket. The base also has a key or spline 61 which is received within a keyway in the socket thereby to insure that the base will be inserted in proper oriented position in the socket. The tube 51 is inserted to the proper depth in the aperture formed in the body 55, as seen in Figs. 8 and 9, and is held in proper position by a metal clamp 59 and yoke arm 60. The three terminals of the contact assembly, which pass through the press of the tube 51, are externally connected by flexible conductors 56 to the three terminal posts 69, the latter being connected to three of the contact prongs 57 by wires embedded in the molded body. The various windings comprising the relay coils 58 are also connected to other of the contact prongs 57 by wires within the molded body. Fig. 10 shows the pole pieces of the legs 50a of the core structure and the magnet 52 with arcuate configurations thereby to conform to the circular aperture within which the tube 51 is inserted.

It will be noted that the tube 51 and its contact assembly is operable with the open end of the bore 42 of the cylindrical body 30 (Fig. 4) downward, but the ball 44 does not drop out due to the field of the permanent magnet 52, Fig. 10, and the ball will remain in the position to which it was last actuated by the signals impressed upon the windings 54. The yoke arm 60 of the clamp member 56 extends under a metal strap 62, Fig. 7, which by means of the screws 63 clamps the arm against the body 55 in any of a plurality of positions to which the arm and the tube 51 may be rotated. This enables the contact elements within the tube to be rotatably adjusted, with respect to the pole pieces of the magnetic structure, to an optimum operating position, and also provides a means for applying a mechanical bias to the relay to compensate for bias present in the received signals.

Figure 16:
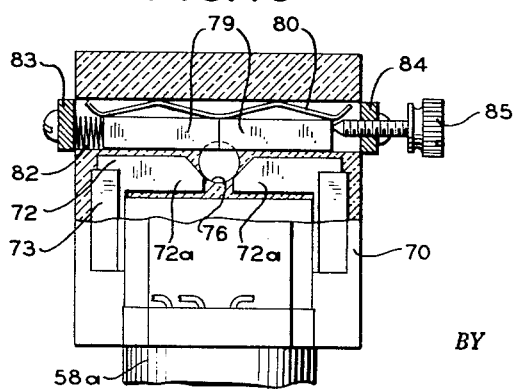
Fig. 16 is a view like Fig. 15, with the evacuated envelope or tube removed from the unit.
Figure 17:
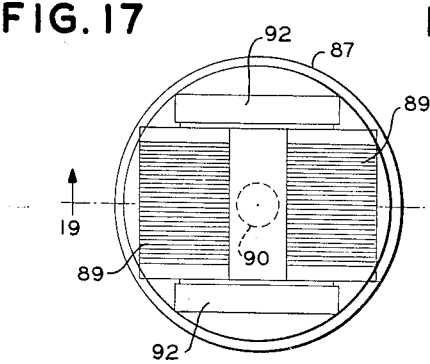
Fig. 17 is a top plan view of another modification of the relay unit.

Figs. 13 to 16 illustrate another embodiment; Fig. 13 is a top plan view of the relay, Figs. 14 and 15 respectively are side and front views, in elevation, of the unit, and Fig. 16 is a view similar to Fig. 15, with the tube and its contact assembly removed. The unit is embedded in a molded octagonal body 70 generally in the manner of the embodiment of Figs. 7 to 10. A circular aperture 76 is formed in the body 70 during the molding operation for the reception of the tube 51', and another aperture 77 which is rectangular in cross-section is also formed during the molding operation. The aperture 77 extends entirely through the body and is disposed at right angles to and immediately above the circular aperture 76. Within the aperture 77 are two permanent bar magnets 79, Figs. 15 and 16, the inner ends of which abut at approximately the center of the aperture, with like poles of the magnets together. Preferably, although not necessarily, the bar magnets are made from an alloy such as "Alnico" which is magnetically saturated. These magnets are positioned above the legs 72a of the laminated core structure 72, and there is thus formed a magnetic Wheatstone bridge in effect, in which the relative flux densities in the two adjacent arms of the bridge are determined by the polar signals that flow through the operate windings of the relay coil 74. A metal clamp 73 binds the laminations of the core structure together until the insulating material which forms the body has hardened in the mold.

A resilient spring 80 which preferably is composed of non-magnetic material, such as Phosphor bronze or beryllium copper, with the aperture 77 causes the inner ends of the magnets 79 to be urged into contact with the glass tube 51' and thereby holds the tube and its contact assembly in proper operating position relative to the poles of the magnetic structure. A coiled compression spring 82 within the aperture 77 has one end thereof abutting a metal strap 83 secured by screws that enter inserts which are embedded in the body 70, and the other end of the spring abuts the outer end of the left-hand bar magnet 79 as viewed in Figs. 15 and 16. A metal strap 84, secured to the body 70 in the manner of strap 83, carries an adjusting screw 85, and the spring 82 urges the pair of magnets 79 in the direction of the adjusting screw. Rotation of the screw 85 enables the longitudinal position of the inner abutting ends of the magnets to be varied relative to the contact assembly within the tube, and this provides a means for mechanically adjusting the relay or for mechanically biasing the relay to compensate for bias present in the received signals. The contact assembly in the tube 51' is connected by flexible conductors to terminal posts 71 and thence by wires within the molded body to three of the contact prongs 57' of the base 58, the wires from the relay coils being connected to the other prongs.

Figure 21:
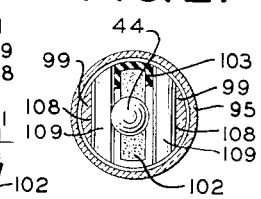
Fig. 21 is a cross-sectional view taken along the line 21—21 of Fig. 20.
Figure 18:
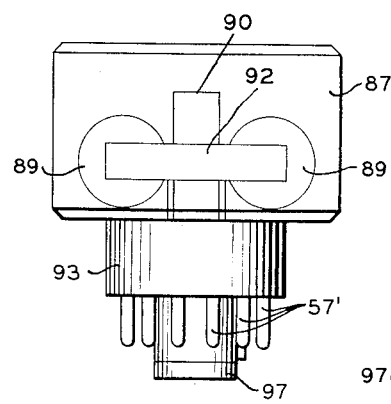
Fig. 18 is a front view, in elevation, of the unit of Fig. 17.
Figure 22:
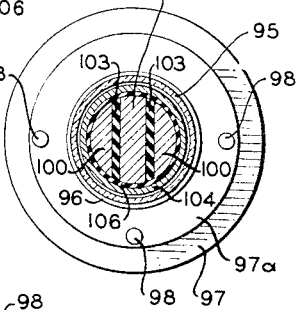
Fig. 22 is a cross-sectional view taken along the line 22—22 of Fig. 20.
Figure 19:
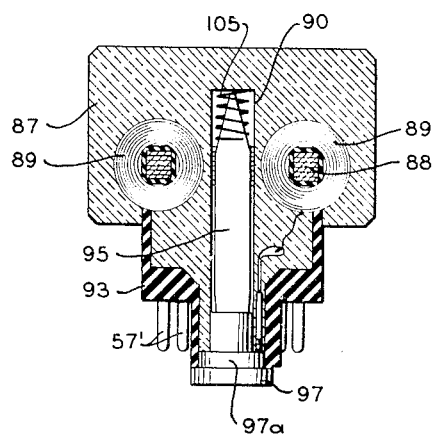
Fig. 19 is cross-sectional view, in elevation, taken along the line 19—19 of Fig. 17.
Figure 23:
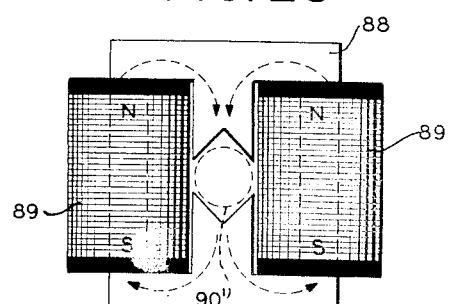
Fig. 23 is a top plan view showing certain details of the magnetic core structure and the electromagnets mounted thereon, removed from the insulating body.

Figs. 17 to 23 show a preferred embodiment in which the contact assembly within the glass tube 95 also includes the permanent magnet which in the preceding embodiments is embedded in the molded body of insulating material. As seen in Fig. 19 the cylindrical molded body 87 has embedded therein the laminating magnetic core structure 88 with the relay windings 89 around the legs of the core. Metal strips 92, Figs. 17 and 18, clamp the laminations together for the molding operation. The body 87 has an aperture 90 formed therein at the time it is molded for thereafter receiving the tube 95 in the manner shown in Fig. 19; Fig. 23 shows that the core laminations are arranged to enable the formation of the aperture in the body. The base 93 which is molded in the body 87, and which carries the contact prongs 57', has an opening therein for receiving the tube 95 and the collar portion 97a of an insulating base 97 secured to and forming part of the removable tube structure. If desired, the body 87 may be molded by pouring the material of which it is composed into a cylindrical shell of copper, aluminum or other sheet metal having a circular opening therein for receiving the base 93, and this mold or shell may be left on the body 87 to provide an outer protective covering therefor.

Figure 20:
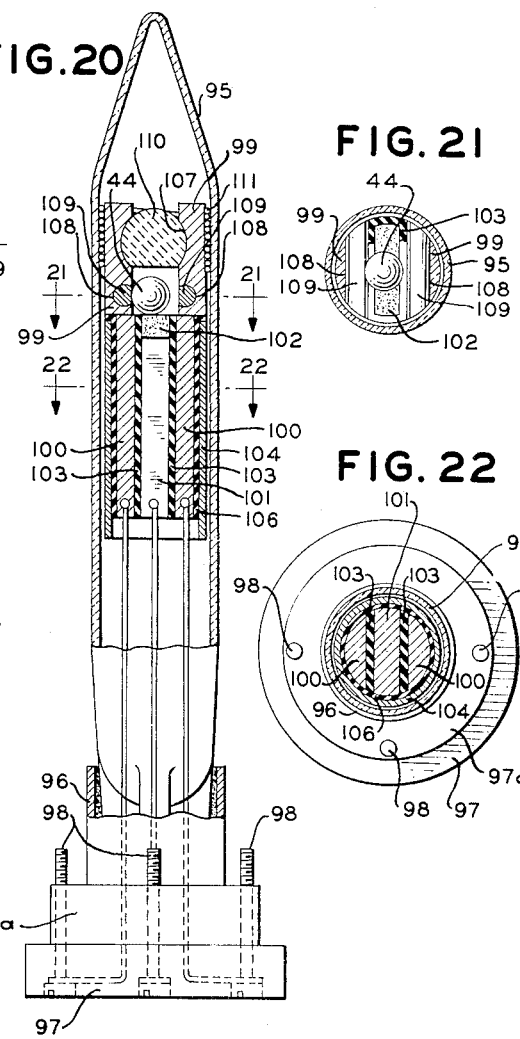
Fig. 20 is a greatly enlarged view, in elevation, of the contact assembly enclosed within its glass envelope, and removed from the relay unit.

Figs. 20 to 22 are greatly enlarged views of the tube 95 and its enclosed elements. A small round rod 99 of magnetic material such as soft iron has one end thereof welded to the end of a slightly smaller round rod 100 of stainless steel or other non-magnetic metal or alloy. A hole at 107 and two smaller holes 108 are drilled transversely through the rod 99, and the rod is sawed in half throughout its length to provide two pole pieces as seen in Fig. 20. Within the small holes 108 are inserted short rods 109 which preferably are composed of tungsten carbide. The rods are welded to the body 99, and their inner faces are ground to form flat surfaces flush with the inner walls of the pole pieces, so that they form flat contact surfaces which are alternately contacted by the ball 44 as signals of opposite polarity are received by the operate winding of the relay.

The rod 100 of stainless steel also is sawed in half throughout its length, and between the stainless steel strips or legs thus formed is inserted a flat strip 101 of permanent magnet material, for example, a copper-nickel-iron alloy such as "Cunife," on the end of which has been welded a thin piece 102 of tungsten carbide or other suitable contact material on which the ball 44 rests. The strip 101 comprises the permanent magnet of the magnetic field circuit, and also connects the contact material 102 to one of the terminals of the tube. Flat strips 103 of mica or other suitable dielectric material insulate the magnet 101 and contact material 102 from the stainless steel strips, and contact material 102 from the stainless steel strips, and the steel strips respectively connect the contact members 109 to two other terminals of the tube.

The assembly of elements 100 to 103 is enclosed within an outer cylindrical shell 104 which is spaced therefrom, and in the space is cast soft glass or "Mycalex" or other plastic molding compound 106 which insulates the enclosed elements from the shell and also locks their positions relative to each other. The "Cunife" strip 101 usually is magnetized after the assembly is completed and sealed in the glass tube. The shell 104 preferably is iron although it may be of any other metal or material, not necessarily magnetic. However, it is advantageous to employ a magnetic material since it provides a return path for the flux of the permanent magnet 101. The lead-in wires which pass through the press of the tube may readily be spot-welded to the Cunife strip 101 and the legs 100 of the stainless steel rod prior to insertion of the assembly within the tube.

The large hole which was drilled at 107 in the iron rod 99 causes the pole pieces to be cut away somewhat and this produces a desired concentration of flux around the ball 44. A short cylindrical rod 110 of insulating material is wedged between the arcuate surfaces at 107 to maintain uniform spacing of the pole pieces and also the contact elements 109, and a winding 111 of glass thread wedges the assembly within the glass tube. The base 97 of the glass tube carries three small machine screws 98, with the lead-in wires of the tube connected under the heads of the screws. The threaded ends of the screws screw into inserts within the molded body thereby to secure the tube in proper position within the aperture 90, as seen in Fig. 19, the inserts also serving to electrically connect the terminals of the tube to the prongs 57' of the base 93. A compression spring 105 serves to cushion the tapered end of the glass tube 95.

Preferably, as hereinbefore set forth, the tube or envelope which contains the contact assembly is exhausted to a high degree of vacuum so that the gas pressure is so low as to insure that no ionization and arcing will occur. However, it is known in the art that if gases in which the atoms have few electrons, such as hydrogen and helium, are under high pressure, for example, of the order of 15 atmospheres, the mean free path of the electrons is decreased to a value such that there is little or no likelihood that ionization and arcing will occur at the operating potentials employed, and therefore there will be no arcing between the elements of the contact assembly. It will be understood that the tube would be composed of a heavier glass and that special precautions would be taken for sealing the tube when such high pressures are employed. For brevity in certain of the claims, the expression "non-ionizable medium" is used to define the condition in which the gas pressure is either below or above the range of pressures which would enable ionization and arcing to occur at the potentials with which the tube and its contact assembly are adapted to be used.

Various modifications of the relay and its contact assembly of the several embodiments shown in the drawings, and various equivalents or substitutes for the elements thereof, will readily occur to those versed in the art without departing from the spirit or scope of the instant invention. The disclosure, therefore, is for the purpose of illustrating the principles of the invention which is not to be regarded as limited except as indicated by the scope of the appended claims.

What is claimed is:

1. A polar relay comprising a magnetic core structure having two adjacent opposed poles and an operate winding responsive to received signals for inducing opposite magnetic poles alternatively therein, a permanent magnet having one pole thereof adjacent to said opposed poles, a sealed tube composed of non-magnetic material, a contact assembly in a non-ionizable medium enclosed within said tube, said contact assembly being positioned between said poles and subject to the resultant flux field produced thereby, said contact assembly comprising a conducting member having a contact surface and two other conducting members respectively having oppositely disposed contact surfaces, an armature comprising a conductive body of magnetic material held in contact continuously with said first named contact surface by the attraction of the permanent magnet pole and operative to travel back and forth on said first named contact surface in response to changes in the polarities of said opposed poles to selectively contact said oppositely disposed contact surfaces alternatively to bridge, and close a circuit between, either of these surfaces and said first named contact surface.

2. A relay according to claim 1, in which said armature is a conductive body of comminuted magnetic material.

3. A relay according to claim 1, in which said armature is a conductive ball of magnetic material movable back and forth on said first named contact surface to selectively bridge, and close a circuit between, either of said oppositely disposed contact surfaces and said first named contact surface.

4. A relay according to claim 1, in which said tube is exhausted to a sufficiently high degree of vacuum to prevent arcing between the armature and contact surfaces at the potentials for which the relay is adapted.

5. A polar relay comprising a magnetic core structure having two adjacent opposed poles and an operate winding responsive to received signals for inducing opposite magnetic poles alternatively therein, a permanent magnet having one pole thereof adjacent to said opposed poles, a sealed tube composed of non-magnetic material, a contact assembly in a non-ionizable medium enclosed within said tube, said contact assembly being positioned between said poles and subject to the resultant flux field produced thereby, said contact assembly comprising a conducting member including a body of magnetic material and having a contact surface and two other conducting members respectively having oppositely disposed contact surfaces, an armature comprising a conductive body of magnetic material held in contact continuously with said first named contact surface by the attraction of the permanent magnet pole and said conducting member of magnetic material and operative to travel back and forth on said first named contact surface in response to changes in the polarities of said opposed poles to selectively contact said oppositely disposed contact surfaces alternatively to bridge, and close a circuit between, either of these surfaces and said first named contact surface.

6. A relay according to claim 5, in which said two other conducting members also include a body of magnetic material.

7. A polar relay comprising a molded body of insulating material, a magnetic core structure having two adjacent opposed poles and an operate winding responsive to received signals for inducing opposite magnetic poles alternatively therein, a permanent magnet having one pole thereof adjacent to said opposed poles, said core structure and operate winding being embedded and sealed in said molded body, said body having an aperture therein extending between said poles, a contact assembly in a non-ionizable medium enclosed within a sealed tube, said tube being composed of non-magnetic material, said contact assembly being removably positioned in said aperture in the molded body and subject to the resultant flux field produced by said poles, said contact assembly comprising a conducting member having a contact surface and two other conducting members respectively having oppositely disposed contact surfaces, an armature comprising a conductive body of magnetic material held in contact continuously with said first named contact surface by the attraction of the permanent magnet pole and operative to travel back and forth on said first named contact surface in response to changes in the polarities of said opposed poles to selectively contact said oppositely disposed contact surfaces alternatively to bridge, and close a circuit between, either of these surfaces and said first named contact surface.

8. A relay according to claim 7, in which said core structure, operate winding and permanent magnet are embedded and sealed in said molded body.

9. A relay according to claim 7, including means for adjusting the operative position of the tube and its contact assembly relative to said resultant flux field to compensate for signal bias effects, and means carried by said molded body for securing said tube and contact assembly in any such adjusted position.

10. A relay according to claim 7, including a base of insulating material partially embedded in said molded body, said base having terminals mounted thereon for connecting the relay to external circuits, said base having an aperture therein in alignment with said aperture in the molded body for receiving the tube and contact assembly, said terminals being spaced around the aperture in said base.

11. A polar relay comprising a molded body of insulating material, a magnetic core structure having two adjacent opposed poles and an operate winding responsive to received signals for inducing opposite magnetic poles alternatively therein, a permanent magnet structure having one pole thereof adjacent to said opposed poles, said core structure and operate winding being embedded and sealed in said molded body, said body having a first aperture therein extending between said poles and having a second aperture therein which intersects a portion of said first aperture, a contact assembly in a non-ionizable medium enclosed within a sealed tube, said tube being composed of non-magnetic material, said tube and contact assembly being removably positioned in said first aperture in the molded body and subject to the resultant flux field produced by said poles, said contact assembly comprising a conducting member having a contact surface and two other conducting members respectively having oppositely disposed contact surfaces, an armature comprising a conductive body of magnetic material held in contact continuously with said first named contact surface by the attraction of the pole of said permanent magnet structure and operative to travel back and forth on said first named contact surface in response to changes in the polarities of said opposed poles to selectively contact said oppositely disposed contact surfaces alternatively to bridge, and close a circuit between, either of these surfaces and said first named contact surface, said permanent magnet structure being positioned in said second aperture and engaging said tube at the intersection of the first and second apertures for securing the tube and contact assembly in proper operating position, and means carried by said molded body for adjusting the relative positions of said magnet structure and tube to compensate for signal bias effects.

12. A polar relay comprising a magnetic core structure having two adjacent opposed poles and an operate winding responsive to received signals for inducing opposite magnetic poles alternatively therein, a sealed tube composed of nonmagnetic material, a contact assembly in a non-ionizable medium enclosed within the sealed tube, a permanent magnet also enclosed within said tube, said tube being removably positioned in the space between said opposed poles, with one pole of said permanent magnet adjacent to said opposed poles and the contact assembly subject to the resultant flux field established thereby, said contact assembly comprising a conducting member mounted on said one pole of the permanent magnet and having a contact surface and two other conducting members respectively having oppositely disposed contact surfaces, an armature comprising a conductive body of magnetic material held in contact continuously with said first named contact surface by the attraction of the permanent magnet pole and operative to travel back and forth on said first named contact surface in response to changes in the polarities of said opposed poles of the magnetic core structure, to selectively contact said oppositely disposed contact surfaces alternatively to bridge, and close a circuit between, either of these surfaces and said first named contact surface.

13. A relay according to claim 12, in which said two other conducting members of the contact assembly are composed of magnetic material and are positioned adjacent to said opposed poles, respectively, of the magnetic core structure.

14. A polar relay contact unit comprising a sealed tube composed of non-magnetic material, a contact assembly in a non-ionizable medium enclosed within said tube, said contact assembly including a permanent magnet, an element having a contact surface positioned adjacent to one pole of said magnet, two other conducting members respectively having oppositely disposed contact surfaces, and an armature comprising a conductive body of magnetic material held in contact continuously with the first named contact surface by the attraction of the permanent magnet pole and operative to travel back and forth thereon in response to changes in polarity in the magnetic flux field of a polar relay for selectively contacting said oppositely disposed contact surfaces alternatively to bridge, and close a circuit between, either of the latter surfaces and the first named contact surface.

15. A relay contact unit according to claim 14, in which said two other conducting members are composed of magnetic material.

16. A polar relay contact unit comprising a sealed tube composed of non-magnetic material, a contact assembly in a non-ionizable medium enclosed within said tube, said contact assembly including a permanent magnet, an element having a contact surface mounted on one pole of said magnet, two other conducting members composed of magnetic material and respectively having contact elements with oppositely disposed contact surfaces, and an armature comprising a conductive ball of magnetic material held in contact continuously with the first named contact surface by the attraction of the permanent magnet pole and operative to travel back and forth thereon in response to changes in polarity in the magnetic flux field of a polar relay for selectively engaging said oppositely disposed contact surfaces alternatively to bridge, and close a circuit between either of the latter surfaces and the first named contact surface.

References Cited in the file of this patent

UNITED STATES PATENTS

| | | |
|---|---|---|
| 684,378 | Potter | Oct. 8, 1901 |
| 685,549 | Wurts | Oct. 29, 1901 |
| 1,380,752 | Toomey | June 7, 1921 |
| 2,015,156 | Richmond | Sept. 24, 1935 |
| 2,111,550 | Armstrong | Mar. 22, 1938 |
| 2,203,321 | Bascom | June 4, 1940 |
| 2,253,856 | Harrison | Aug. 26, 1941 |
| 2,277,215 | Ellwood | Mar. 24, 1942 |
| 2,336,101 | Irwin et al. | Dec. 7, 1943 |
| 2,414,525 | Hill et al. | Jan. 21, 1947 |
| 2,632,211 | Trigg | Mar. 24, 1953 |

FOREIGN PATENTS

| | | |
|---|---|---|
| 113,769 | Sweden | Apr. 10, 1945 |
| 536,695 | Great Britain | May 23, 1941 |
| 680,098 | Great Britain | Oct. 1, 1952 |